Sept. 13, 1966  M. T. BOWERS  3,271,893
DETACHABLE FISHING FLOAT
Filed May 13, 1964
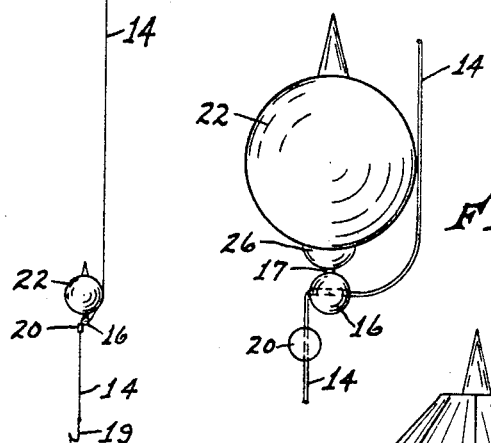
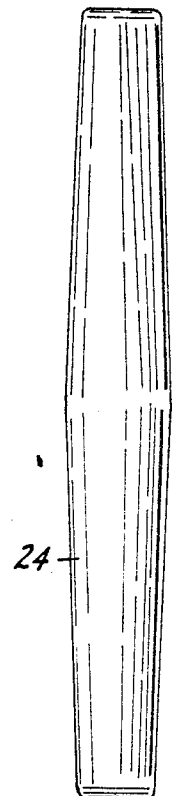
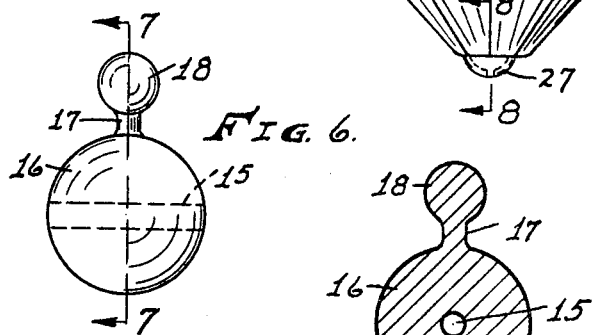
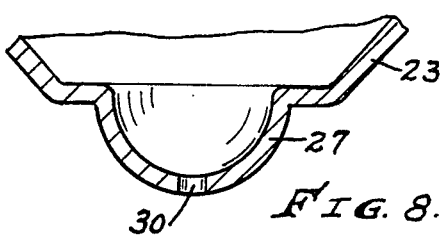
MARVIN T. BOWERS,
INVENTOR.
BY Donald E. Windle.
ATTORNEY.

United States Patent Office 3,271,893
Patented Sept. 13, 1966

3,271,893
DETACHABLE FISHING FLOAT
Marvin T. Bowers, 3707 North Drive,
Greenville, Ohio
Filed May 13, 1964, Ser. No. 367,112
3 Claims. (Cl. 43—43.14)

The invention relates to detachable fishing floats or rather floats which may be quickly and easily attached to and detached from a fishing line. In fishing it is often desirable to change floats. In some instances it is desirable to use small floats while in other instances it is desirable to use larger floats. In the conventional types of floats, there is no means of detaching the floats from the fishing lines without cutting the lines. This procedure consumes considerable time and wastes a considerable amount of the fishing line.

In view of the above, it is the principal object of the present invention to provide floats having detachable means whereby one float may be detached from the fishing line and another be attached in a comparatively short interval of time, and without the necessity of cutting the line.

A second object is the provision of means which permits the use af a variety of floats whereby the fisherman can use different types of floats without damage to the fishing line.

A third object is the provision of a snap-in device through which the fishing line passes freely, and with there being an adjustable means frictionally slidable on the fishing line establishing the depth to which the hook is submerged in the water.

Further objects and particular advantages of the present invention will become more apparent in the course of the following description, and that which is new will be pointed out in the appended claims.

In order that the use, the construction, and the operation of the invention may be more fully understood and appreciated, I will now take up a detailed description thereof in which the same will be more fully set forth, with reference being had to the accompanying drawing forming a part thereof, in which:

FIGURE 1 is an elevation showing the forward end of a fishing rod together with a fishing line, a float embodying the features of the invention, and a fishing hook.

FIGURE 2 is an enlarged detail showing the float and the snap fastener through which the fishing line extends.

FIGURE 3 is a detail elevation of a float showing a variation in shape from that shown in FIGURE 2.

FIGURE 4 is an elevational view of a variation in the form of a float.

FIGURE 5 is an elevational view showing a still further variation in the form of a float.

FIGURE 6 is an enlarged detail elevation of the snap fastener member.

FIGURE 7 is a detail vertical section through the snap fastener, as taken on line 7—7 of FIGURE 6.

FIGURE 8 is a detail section through the lower portion of the float shown in FIGURE 3, as taken on line 8—8 of FIGURE 3.

Like characters of reference designate like parts throughout the several views of the drawing.

Referring now to the drawing in detail, numeral 11 designates the forward portion of a fishing rod with the same having guides 12 and 13 secured thereto and through which fishing line 14 passes. The fishing line extends downwardly from the end of the fishing rod and passes through an aperture 15 of the snap fastener 16. It will be noted, by referring to FIGURES 6 and 7, snap fastener 16 has a neck portion 17 formed integrally therewith, and with a comparatively smaller ball 18 being formed on the opposite or upper end of the neck portion 17. After passing through the aperture 15 of the snap fastener, the line has a fishing hook 19 secured on the free end thereof. A lead weight or sinker 20 is secured on the line 14 and is located below the snap fastener 16 and above the hook 19. It will be noted a float stop 21 is frictionally secured on the fishing line 14 and is located above the snap fastener 16. The float stop is capable of movement along line 14 and provides means determining the distance between the snap fastener 16 and the hook 19. The float stop 21 is of such size to permit the same to pass through guides 12 and 13, but is of such size to prevent the same from passing through aperture 15 of the snap fastener.

Float 22, shown in FIGURES 1 and 2, float 23 shown in FIGURE 3, and float 24 shown in FIGURE 4, and float 25 shown in FIGURE 5, illustrate different types of floats, with each being adapted to be snapped onto a snap fastener 16 by means of the ball 18. Each of the floats shown have the lower ends formed into a snap fastener-receiving semi-spherical bulbous-shaped projection or protuberance. Float 22 has the semi-spherical bulbous-shaped protuberance 26 formed thereon, float 23 has the semi-spherical bulbous-shaped protuberance 27 formed thereon, float 24 has the semi-spherical bulbous-shaped protuberance 28 formed thereon, and float 25 has the semi-spherical bulbous-shaped protuberance 29 formed thereon. All of the semi-spherical bulbous-shaped protuberances are alike and the description of one will suffice for all. Referring to FIGURE 8, semi-spherical bulbous-shaped protuberance 27 is formed integrally with float 23 and has aperture 30 formed through the lower end thereof for the reception of ball 18 of the snap fastener 16.

The floats and the snap fastener 16 are preferably made of polyethylene or similar material which lends itself to the moulding process.

Operation

In the use of the device, the free end of fishing line 14 is threaded through float stop 21. Snap fastener 16 is then threaded onto the line 14, after which sinker 20 is secured on the line. Hook 19 is secured on the free end of the line 14. Float stop 21 is of such construction to permit the same to be frictionally moved along line 14 with the position of the same with relation to the hook determining the distance the hook and sinker extends into the water. After the members 16, 19, 20 and 21 have been assembled on the line 14, any one of the floats shown may be snapped onto the ball 18 of the snap fastener 16, with the ball 18 entering the protuberance of the semi-spherical bulbous-shaped lower end of the float through aperture 30, and with the aperture 30 gripping about the neck 17 of the snap fastener 16.

When it is desired to remove a float from the snap fastener, the snap fastener is pulled from the protuberance of the float.

While the presently-preferred forms of detachable floats have been shown and described, I desire that it be understood that minor changes may be made therein, insofar as the changes may fall within the scope of the appended claims in their broadest form.

Having now shown and described the invention, what I claim and desire to secure by Letters Patent of the United States is:

1. In combination with a fishing line, a hollow float, a semi-spherical bulbous-shaped protuberance formed on the hollow float, there being an aperture formed through the semi-spherical bulbous-shaped protuberance, a snap fastener threaded onto the fishing line, a ball formed on the snap fastener with said ball being adapted to be snapped into the semi-spherical bulbous-shaped protuberance, and with the ball entering the semi-spherical bulbous-shaped protuberance through the aperture formed therethrough.

2. A detachable fishing float, said float being composed of a hollow body portion, a semi-spherical bulbous-shaped protuberance formed on the lower end of the float, there being an aperture formed through the lower end of the semi-spherical bulbous-shaped protuberance, a snap fastener, a ball, said ball being connected to the snap fastener by means of a neck portion extending therebetween, with the ball of the snap fastener being adapted to enter the semi-spherical bulbous-shaped protuberance of the float through an aperture formed therein, and with the snap fastener having a fishing line-receiving aperture formed therethrough.

3. In a detachable hollow fishing float, a semi-spherical bulbous-shaped protuberance formed thereon, there being an aperture formed vertically through the bottom of the semi-spherical bulbous-shaped protuberance, a snap fastener, said snap fastener having one end of ball shape and adapted to enter the aperture formed vertically through the protuberance of the semi-spherical bulbous-shaped lower end of the float, said snap fastener having a larger depending portion formed integrally therewith, and with the larger depending portion having an aperture formed therethrough for the reception of a fishing line.

References Cited by the Examiner
UNITED STATES PATENTS

| | | | |
|---|---|---|---|
| 2,792,665 | 5/1957 | Brickler | 43—44.87 |
| 3,102,359 | 9/1963 | Cahill et al. | 43—43.14 |
| 3,137,961 | 6/1964 | Bowers | 43—43.1 |

ABRAHAM G. STONE, *Primary Examiner.*

SAMUEL KOREN, *Examiner.*

R. L. HOLLISTER, *Assistant Examiner.*